United States Patent
Bermudez et al.

(10) Patent No.: US 11,030,663 B2
(45) Date of Patent: Jun. 8, 2021

(54) CROSS-PLATFORM RATING SYSTEM

(71) Applicant: Capital One Services, LLC, McLean, VA (US)

(72) Inventors: Sophie Bermudez, Washington, DC (US); Salik Shah, Washington, DC (US); Lea Cody, Arlington, VA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/504,680

(22) Filed: Jul. 8, 2019

(65) Prior Publication Data

US 2021/0012395 A1      Jan. 14, 2021

(51) Int. Cl.
*G06Q 30/02* (2012.01)
*G06Q 50/06* (2012.01)
*G06Q 50/14* (2012.01)
*G06Q 10/02* (2012.01)

(52) U.S. Cl.
CPC ......... *G06Q 30/0282* (2013.01); *G06Q 10/02* (2013.01); *G06Q 50/06* (2013.01); *G06Q 50/14* (2013.01)

(58) Field of Classification Search
USPC .......................................................... 705/347
See application file for complete search history.

(56) References Cited

U.S. PATENT DOCUMENTS

| | | | |
|---|---|---|---|
| 7,356,507 B2 | 4/2008 | Bezos et al. | |
| 8,332,517 B2 | 12/2012 | Russell | |
| 2004/0039679 A1 * | 2/2004 | Norton | G06Q 40/04 705/37 |
| 2006/0218025 A1 | 9/2006 | Miller et al. | |
| 2006/0277290 A1 | 12/2006 | Shank | |
| 2009/0063167 A1 | 3/2009 | Bartot et al. | |

(Continued)

FOREIGN PATENT DOCUMENTS

WO    WO-2007101256 A2 *   9/2007   ............. G06Q 10/02

OTHER PUBLICATIONS

AirBNB.com See Your Guests' Ratings viewed at https://blog.atairbnb.com/guest-star-ratings/, dated Oct. 12, 2017, pp. 1-5 (Year: 2017).*

(Continued)

*Primary Examiner* — Michael Young
(74) *Attorney, Agent, or Firm* — Kacvinsky Daisak Bluni PLLC

(57) ABSTRACT

A rating may be received for a user based on a stay at a lodging establishment, the rating comprising a positive attribute and a negative attribute. The rating may be based on data entered by a user of the lodging establishment and programmatically generated data. An overall rating may be generated based on the rating and a plurality of prior ratings for the user. A request to reserve a second stay at the lodging establishment may be received. A price for the second stay at the lodging establishment may be received. A reduced price for the second stay may be determined based on the overall rating for the user being above a threshold rating. An indication of the reduced price may be outputted for display. A dwelling unit in the lodging establishment for the second stay may be reserved at the reduced price.

18 Claims, 9 Drawing Sheets

(56) References Cited

U.S. PATENT DOCUMENTS

| | | | |
|---|---|---|---|
| 2009/0144272 A1 | 6/2009 | Adarsh et al. | |
| 2011/0004624 A1* | 1/2011 | Bansal | G10L 15/10 |
| | | | 707/776 |
| 2012/0203630 A1* | 8/2012 | Goel | G06Q 10/02 |
| | | | 705/14.49 |
| 2014/0129942 A1* | 5/2014 | Rathod | H04N 21/44222 |
| | | | 715/720 |
| 2014/0222518 A1 | 8/2014 | Adkins | |
| 2018/0047106 A1* | 2/2018 | Snyder | G06Q 40/08 |

OTHER PUBLICATIONS

Shallcross, Juliana 5 Tips to Remember When You Pay for A Hotel Room archived at https://web.archive.org/web/20170102175516/ https://www.frommers.com/tips/hotel-news/5-tips-to-remember-when-you-pay-for-a-hotel-room , dated Jan. 2, 2017, viewed Oct. 14, 2019, p. 1 (Year: 2017).*

K. Hashmi, E. Najmi, N. Ammar, Z. Malik and B. Medjahed, "Sentiment Analysis for intelligent ratings management," 2014 IEEE/ACS 11th International Conference on Computer Systems and Applications (AICCSA), Doha, 2014, pp. 389-396, doi: 10.1109/AICCSA.2014.7073225. (Year: 2014).*

Lopez, A., "Do hotels have an internal guest rating system?", Quora [online] 2017 [retrieved on May 9, 2019]. Retrieved from Internet URL: https://www.quora.com/Do-hotels-have-an-internal-guest-rating-system, 3 pages.

* cited by examiner

Guest Checklist

Guest ID: xxxxxxx789
Location: Sunrise Hotel
Dates: 8/1/2018 – 8/17/2018
Room: 105
Checkin: On Time
Checkout: Late
Damage? $100 broken window
Comments:

202 — Guest was very friendly and kept the room clean. - Housekeeper

203 — Guest slipped and caused the window to break. It was an accident. The guest was very apologetic. We welcome him back any time. – Management

Checkout Page

Please review your choices below:
Location: Sunrise Hotel
Dates: 8/1/2019 – 8/17/2019

Price: $99 $90 (you save 10% based on your rating!)

Rating Upgrades – Please choose one of the following upgrades based on your rating!

○ Mountain View Room
○ Sea View Room
○ Free Breakfast

Paying with card xxxxxxx789 – your rating ID.

[ Reserve Now ]

Checkout Page

Please review your choices below:
Location: Sunrise Hotel
Dates: 8/1/2019 – 8/17/2019

Price: $109 ($99 plus $10 security deposit)

Paying with card xxxxxx789 – your rating ID.

111

Reserve Now

CROSS-PLATFORM RATING SYSTEM

TECHNICAL FIELD

Embodiments herein generally relate to computing services, and more specifically, to cross-platform rating systems.

BACKGROUND

Lodging establishments, merchants, common carriers, and service providers often have different experiences with their customers. Conventionally, many details of these experiences are not monitored or recorded, regardless of whether the experience is positive or negative. Even if some data describing the experience is captured, this is a manual process that does not scale across different providers, even if the providers are owned by the same entity. Furthermore, even if some data is captured, conventional solutions do not use the data in any meaningful way once the experience is completed.

SUMMARY

Embodiments disclosed herein provide systems, methods, articles of manufacture, and computer-readable media for cross-platform ratings. In one example, a first rating may be received for a user based on a first stay at a first lodging establishment, the first rating comprising at least one positive attribute and at least one negative attribute for the first stay of the user at the first lodging establishment, the first rating based on at least data entered by a user associated with the first lodging establishment and programmatically generated data, a first account used to pay for the first stay. An overall rating may be generated based on the first rating and a plurality of prior ratings for the user, the overall rating based at least in part on the at least one positive attribute and the at least one negative attribute for the first stay for the user at the first lodging establishment. A request from the user to reserve a second stay at the first lodging establishment using the first account as payment may be received. A price for the second stay at the first lodging establishment may be received. A reduced price for the second stay may be determined based on the overall rating for the user being above a threshold rating, the reduced price less than the received price for the second stay. An indication of the reduced price may be outputted for display. An indication of acceptance of the reduced price for the second stay may be received. A dwelling unit in the first lodging establishment for the second stay may be reserved at the reduced price using the first account as payment.

BRIEF DESCRIPTION OF THE DRAWINGS

FIG. 2 illustrates an embodiment of a cross-platform rating.

FIG. 3 illustrates an embodiment of a reservation system using cross-platform ratings.

FIG. 4 illustrates an embodiment of a reservation system using cross-platform ratings.

DETAILED DESCRIPTION

Figure 1:
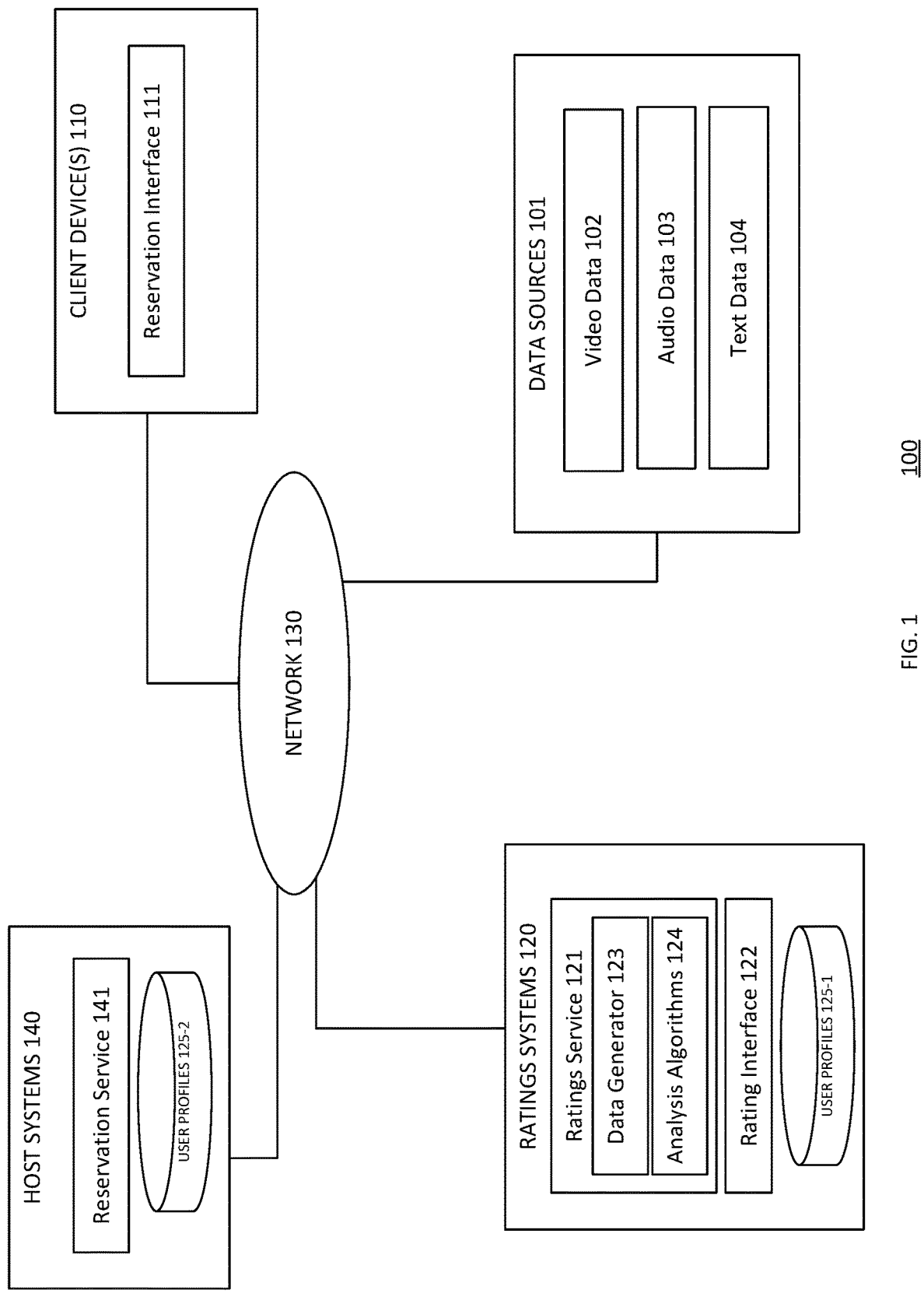
FIG. 1 illustrates an embodiment of a system that provides a cross-platform rating system.

Embodiments disclosed herein provide solutions for cross-platform ratings. Generally, embodiments disclosed herein may receive data describing user interactions and/or transactions from one or more data sources to generate one or more attributes describing the customer interactions and/or transactions. Furthermore, one or more employees may provide data describing the customer and/or ratings for the user. Based on the received data and/or ratings, embodiments disclosed herein may generate a rating for the user, where the rating is associated with a card and/or account used to pay for a good, service, lodging, and/or ticket received by the user. Embodiments disclosed herein may further update the rating based on one or more prior ratings of the user, whether the prior ratings are based on the same entity and/or a different entity. When the user attempts to pay for a subsequent transaction with an entity using the associated card, embodiments disclosed herein may leverage the rating of the user to modify the terms of the subsequent transaction. For example, embodiments disclosed herein may modify the price of the subsequent transaction, provide rewards and/or incentives, or generally modify any term of the subsequent transaction.

Advantageously, embodiments disclosed herein provide techniques to programmatically generate customer ratings based on data received from different data sources. Doing so provides more accurate ratings regardless of the number and type of prior customer interactions. Furthermore, embodiments disclosed herein facilitate cross-platform ratings by associating the customer ratings with a payment mechanism used by the customer. Doing so provides additional accuracy and security to entities conducting business with customers, as these entities may modify the terms of any agreement based on the rating to provide protection against possible loss.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 depicts a schematic of an exemplary system 100, consistent with disclosed embodiments. Generally, the system 100 is configured to provide cross-platform ratings for users. Although ratings for customers (or guests) of a lodging establishment are provided as a reference example of user ratings herein, the disclosure is equally applicable to other types of user ratings. For example, the ratings may be for users of services (e.g., delivery services, transportation services, home improvement services, etc.), users who purchase and/or lease goods or other items from merchants, users who dine at restaurants or other eating establishments, users of computing services, passengers of transportation services (e.g., airline passengers, train passengers, bus passengers, etc.). Furthermore, the lodging establishment may be any structure which provides lodging, such as a hotel, motel, inn, bed and breakfast, house, apartment, condominium, etc. In some embodiments, the accommodations provided by the lodging establishment may be reserved through a separate entity, such as rental agency, property management company, online booking service, etc. More generally, the user ratings may apply to any type of commercial interaction.

As shown, the system 100 includes one or more data sources 101, one or more client devices 110, one or more ratings systems 120, and one or more host systems 140. The data sources 101, client devices 110, ratings systems 120, and host systems 140 are representative of any computing system, such as servers, compute clusters, desktop computers, smartphones, tablet computers, wearable devices, laptop computers, portable gaming devices, virtual machines, and the like.

The data sources 101 may provide data used to generate ratings for customers. For example, as shown, the data sources 101 may provide data comprising video data 102, audio data 103, and/or text data 104. Therefore, the data sources 101 may include microphones, image capture devices (e.g., cameras), and other devices that provide video data, audio data, and/or text data. For example, the data sources 101 may include tablet computers used by housekeeping staff in a hotel to capture images of rooms in the hotel (e.g., to identify damage caused by a guest staying in the room), capture audio (e.g., of loud music emanating from a room), and receive text input from the housekeeping staff describing the guest (e.g., describing interactions between the staff and guest, etc.). As another example, the data sources 101 may include a plurality of security cameras with microphones configured to capture audio and/or video in common areas of the hotel. As another example, the data sources 101 may include billing systems which provide indications of resource consumption by a user, such as water consumption, electricity consumption, etc. As yet another example, the data sources 101 may include point of sale systems reflecting how much a user spends during a stay at a lodging establishment (e.g., how much the user spent at the gift shop, restaurants, etc.). As additional examples, the data sources 101 may include hotel billing systems, reservation systems, payment transaction logs, etc.

As shown, the ratings systems 120 include a ratings service 121, a ratings interface 122, and a data store of user profiles 125-1. The ratings service 121 is configured to compute ratings for users based at least in part on data received from the data sources 101 and/or the host systems 140. As shown, the ratings service 121 includes a data generator 123 and one or more analysis algorithms 124. The data generator 123 is configured to generate data based on the data received from the data sources 101. For example, if a billing statement for a hotel guest indicates a charge of $50 for damage to the room, the data generator 123 may generate an indication of damage and store the indication of damage to the user's profile in the user profiles 125-1. The analysis algorithms 124 are representative of any type of analysis algorithm, such as natural language processing algorithms, image processing algorithms, computer vision algorithms, facial recognition algorithms, machine learning algorithms, and the like.

The ratings service 121 may, therefore, apply the analysis algorithms 124 to the data received from the data sources 101. For example, the analysis algorithms 124 may process images of a hotel room in the video data 102 to determine that a guest broke a chair in the room (e.g., based on detecting the broken chair and/or comparing the most recent image of the room to a prior image of the room and identifying a difference between the chair in each image). As such, the ratings service 121 may store an indication of the damage as a negative attribute in the user's profile 125-1 and consider the damage attribute when computing a rating for the user. As another example, the analysis algorithms 124 may analyze a statement written by the manager of the hotel and determine that sentiment in the statement indicates that the broken chair was the result of an accident and the guest was apologetic. As such, the ratings service 121 may refrain from storing a negative attribute in the user profile 125-1. Instead, the ratings service 121 may store a positive attribute in the user profile 125-1 and consider the positive attribute when computing a rating for the user.

Generally, when computing a rating for the user, the ratings service 121 may consider any attribute of the user specified in the user profile 125-1 (and/or user profiles 125-2 of the host systems 140), any data received from the data sources 101, any data received from the host systems 140, any data generated by the data generator 123, and/or any data generated by the analysis algorithms 124. In some embodiments, the ratings service 121 uses a function that applies one or more weights to each attribute in the user profile 125 when computing the rating for the user. The weights may be different for each type of attribute (e.g., differing weights for positive and/or negative attributes in the profile). For example, the ratings service 121 may use a function that applies a first weight to a timeliness attribute specifying whether the user checks out on time, a second weight to a damage attribute specifying whether the user causes damage to their room and/or other common areas of the hotel, a third weight to a spending attribute indicating an average amount spent by the user at the hotel, a fourth weight to a resource use attribute indicating a cost for the resources used by the user, a fifth weight to a noise attribute reflecting how much noise the user generates during their stay, and a sixth weight to politeness attribute reflecting the politeness of the user when interacting with staff and/or other guests during their stay.

The ratings service 121 may further consider prior ratings of the user when computing an updated (or overall) rating for the user. The prior ratings may be stored in the user profiles 125-1 and/or the user profiles 125-2. For example, the ratings service 121 may apply a respective weight to the prior ratings of the user when computing an overall rating for the user. In one embodiment, the ratings service 121 computes a total cost for a given user stay at a lodging establishment and considers the total cost when computing the overall rating for the user and/or the rating for a given stay at a lodging establishment. For example, the ratings service 121 may determine that the user paid $100 for a one-night stay at a hotel, spent $50 at the hotel restaurant, and spent $150 at the spa. The rating service 121 may further determine that the user consumed an excessive amount of water and electricity (relative to the average user) totaling $20, caused $300 in damage to the room, and required an extra hour of labor to clean the room totaling $100. Therefore, the rating service 121 may determine that the hotel incurred a net loss of $120 for the stay. As a result, the rating service 121 may compute a lower rating for the user based on the net loss for the stay. The lower rating may be for the stay and/or the overall rating.

More generally, the ratings service 121 may compute any number and type of ratings for a user. For example, in one embodiment, the ratings service 121 may compute a numerical value that is in a range of numerical values (e.g., 0-100) for user ratings. As another example, the ratings service 121 may compute a rating that is of a tier of ratings (e.g., low, medium, high ratings). Once computed, the ratings service 121 may store the rating in the user profile 125 (including profiles 125-1 and/or 125-2) for the user. In at least one embodiment, the user profiles 125-1 (and 125-2) are indexed based on a payment card (or account) number provided by the user as a form of payment. Therefore, each customer may be uniquely identified based on the card number of the payment card, thereby facilitating cross-platform ratings.

Once computed, the ratings service 121 may provide ratings information for a user to different entities. For example, a user of a client device 110 may attempt to reserve a hotel room using the reservation interface 111 using the payment card associated with their user profile. The user may generally log in to the reservation interface 111 using login credentials, biometric input, etc. Once logged in, the reservation interface 111 may identify the payment card associated with the user profile. The reservation interface 111 may provide the payment card and/or other login credentials to the reservation service 141 provided by one or more host systems 140. Before processing the requested reservation, the reservation service 141 may receive the rating for the requesting user (e.g., from the user profiles 125-2 and/or from the ratings service 121). In response, the reservation service 141 may consider the received rating when processing the requested reservation. For example, the reservation service 141 may increase the price of the requested room if the user's rating is below a threshold rating. As another example, the reservation service 141 may decrease the price of the requested room if the user's rating is above a threshold rating. As another example, the reservation service 141 may offer the user upgrades and/or rewards if the user's rating is above a threshold rating. In some embodiments, the reservation service 141 may offer rewards and/or upgrades based on user preferences specified in the user profiles 125 (e.g., the user prefers rooms with ocean views, the user prefers meal vouchers instead of spa vouchers, etc.).

The user may then complete the reservation using the payment card. During the user's stay, the data sources 101 may capture data describing the user's stay. The data sources 101 may provide the data to the ratings service 121 periodically and/or upon completion of the user's stay. The ratings service 121 may then compute a rating for the user's stay. The ratings service 121 may further compute an updated overall rating for the user based on all previous ratings specified in the user profile 125 for the user. The ratings service 121 may then periodically provide the generated ratings to the host systems 140 for use. For example, by providing the ratings for the user to different host systems 140, the ratings service 121 facilitates cross-platform ratings for users. For example, if the user stayed at Hotel A, the host system 140 for Hotel B may receive the ratings generated based on the stay at Hotel A. Doing so allows all providers to maintain accurate ratings data for each user, and modify reservation pricing, incentives, and rewards accordingly.

FIG. 2 illustrates a graphical user interface (GUI) 200 provided by the ratings interface 122 to receive ratings data, according to one embodiment. As shown, the GUI 200 includes one or more attributes, such as hotel name, guest ID (which may be the payment card number), room number, etc. Some attributes may be received from the data sources 101 directly (e.g., from the hotel reservation system, billing system, etc.). In some embodiments, the data generator 123 generates one or more values depicted in the GUI 200. For example, the data generator 123 may receive text data 104 from the hotel indicating that the checkout time is 11:00 AM, but the user's actual checkout time was 1:00 PM. Therefore, the data generator 123 may determine that the user was late in checking out. In turn, the ratings service 121 may store an indication of the late checkout, and optionally use the late checkout as a negative factor when computing a rating for the stay and/or the user's overall rating. For example, the ratings service 121 may reduce the rating for the stay and/or the user's overall rating based on the indication of the late checkout generated by the data generator 123.

As shown, the GUI 200 also includes a narrative portion 201. The narrative portion 201 may reflect narrative ratings provided by different users in the hotel via the ratings interface 122. For example, as shown, a narrative rating 202 from a housekeeper specifies that the user was very friendly and kept the room clean. As another example, a narrative rating 203 from the hotel manager specifies that a window in the room was broken by accident and that the user was very apologetic. Therefore, the analysis algorithms 124 may analyze the narrative ratings 202, 203 and extract concepts from the text. The concepts may include "friendly", "clean", "accident", and "apologetic". The ratings service 121 may consider these concepts given the charge for $100 the broken window. For example, the ratings service 121 may determine not to reduce the user's rating based on the broken window. As another example, the ratings service 121 may determine to minimally reduce the user's rating based on the broken window (relative to a greater reduction for purposefully breaking the window). Furthermore, the ratings service 121 may determine to increase the user's rating based on the positive concepts extracted by the analysis algorithms 124 from the narrative ratings 202, 203.

FIG. 3 illustrates an example GUI 300 provided by the reservation interface 111 executing on a client device 110, according to one embodiment. As shown, the GUI 300 reflects that the user attempting to reserve a hotel room is provided a discount on the room rate based on their rating computed by the ratings service 121. More specifically, as shown, the user is offered a 10% discount by the reservation service 141 based on the user rating. For example, the reservation service 141 may provide the discount upon determining the user's rating exceeds a threshold. Furthermore, the reservation service 141 offers the user one or more upgrades based on their rating. For example, as shown, the upgrades include different room types and complimentary meals. The user may select the desired upgrade and complete the reservation using the payment number associated with the rating in the user profiles 125.

FIG. 4 illustrates an example GUI 400 provided by the reservation interface 111 executing on a client device 110, according to one embodiment. As shown, the GUI 400 reflects that the user attempting to reserve a hotel room is charged a security deposit in addition to the standard room rate based on their rating computed by the ratings service 121. More specifically, as shown, the reservation service 141 requires a $10 security deposit based on the rating of the user associated with the payment card. For example, the reservation service 141 may determine to charge the security deposit upon determining the user's rating is below a threshold rating. As another example, the reservation service 141 may determine to charge the security deposit based on a count of instances of damage caused by the user specified in the user profile 125 exceeding a threshold number of instances of damage. If the user approves, the user may reserve the room by paying the standard room rate and the security deposit. Furthermore, as shown, the reservation service 141 does not provide any rewards and/or upgrades to the user based on the rating in the profiles 125.

Figure 5:
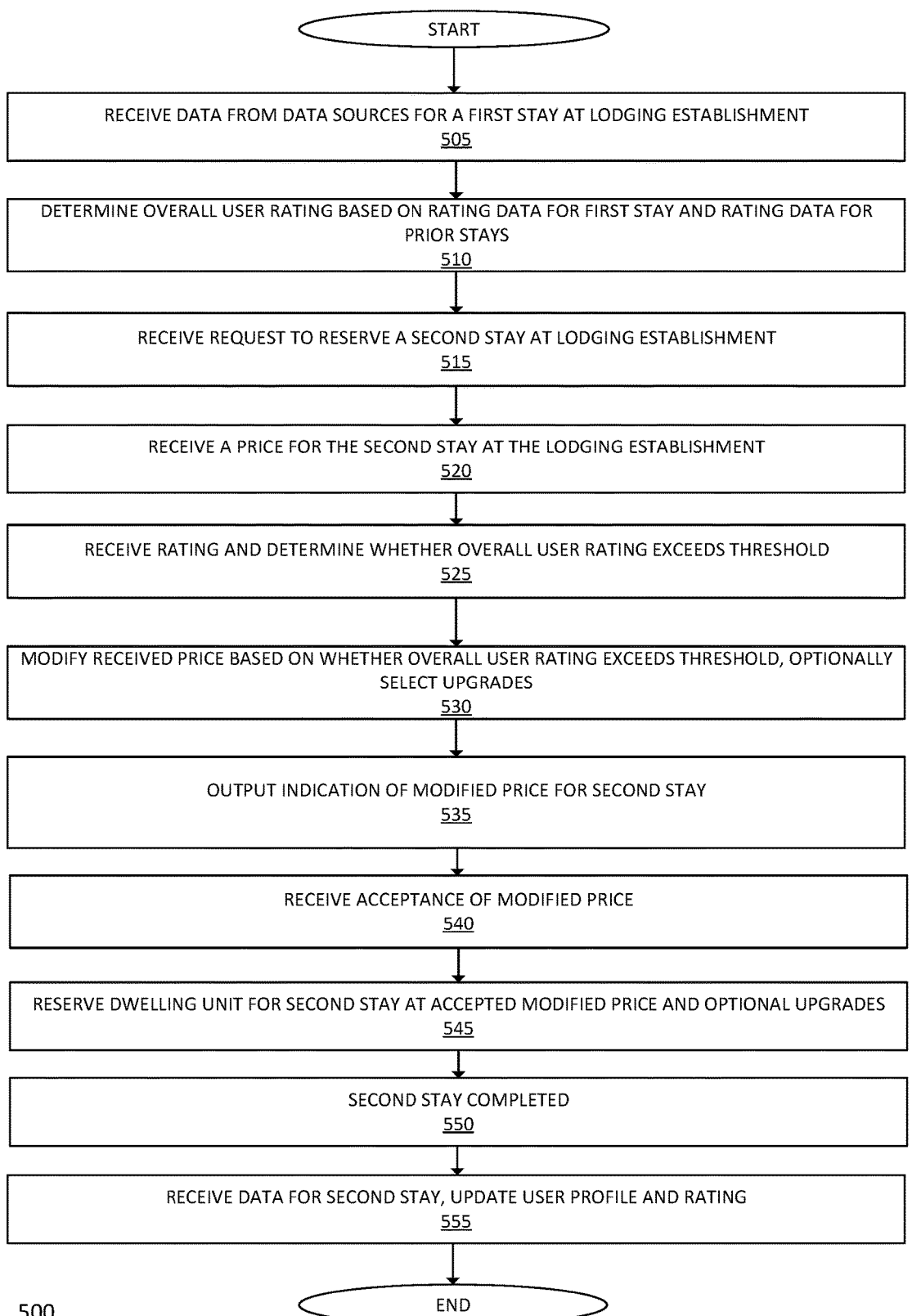
FIG. 5 illustrates an embodiment of a first logic flow.

FIG. 5 illustrates an embodiment of a logic flow 500. The logic flow 500 may be representative of some or all of the operations executed by one or more embodiments described herein. For example, the logic flow 500 may include some or all of the operations performed to provide cross-platform ratings. Embodiments are not limited in this context.

As shown, the logic flow 500 begins at block 505, where the ratings service 121 receives data from the data sources 101 for a first stay of a user at a lodging establishment (e.g., a hotel, motel, bed and breakfast, etc.). The data received from the data sources 101 may include video data 102, audio data 103, and/or text data 104. For example, the data may include text data 104 comprising billing activity, transaction activity, arrival and/or checkout times, etc. The text data 104 may further include reviews and/or other input regarding the user and/or the user's first stay provided by employees of the hotel via the ratings interface 122. As another example, the video data 102 may include video of the user in the lobby of the hotel and images of the room the user stayed in during the first stay, while the audio data 103 may include recordings of interactions between the user and the hotel staff.

At block 510, the ratings service 121 determines an overall user rating for the user based on the data received at block 505 and data in the user profile 125. For example, the data in the user profile 125 may include an overall user rating for the user prior to the first stay. The ratings service 121 may determine a rating for the first stay based on the data received from the data sources and use the determined rating for the first stay to update the overall rating for the user. For example, if the user caused significant damage to the room during the first stay, the ratings service 121 may compute a relatively low rating for the user for the first stay. In turn, the ratings service 121 may compute an overall rating for the user based on the first stay and the prior stays that is lowered based on the relatively low rating for the first stay.

At block 515, a reservation service 141 may receive a request to reserve a second stay at the lodging establishment from the user via the reservation interface 111. At block 520, the reservation service 141 may receive a price for the second stay at the lodging establishment. For example, the price may be $150. At block 525, the reservation service 141 receives the overall rating for the user from the ratings service 121 and/or the user profiles 125-2. The reservation service 141 may determine whether the user's overall rating exceeds a threshold. At block 530, the reservation service 141 modifies the price received at block 520 based on whether the rating exceeds the threshold. For example, if the rating exceeds the threshold, the reservation service 141 may reduce the price, e.g., to $130. In some such embodiments, the reservation service 141 may provide other rewards and/or upgrades for the second stay, e.g., based on preferences in the user profile 125. If the rating is below the threshold, however, the reservation service 141 may increase the price, e.g., to $165. In some embodiments, the threshold is one of a plurality of thresholds, where each threshold is associated with a respective increase and/or decrease in the price. For example, a rating of 90-100 may be associated with a 15% decrease in the price, while a rating of 80-89 may be associated with a 5% decrease in price. Similarly, a rating of 30-39 may be associated with a 5% increase in price, while a rating of 20-29 may be associated with a 10% increase in price.

At block 535, the reservation service 141 outputs the modified price and any selected upgrades via the reservation interface 111. At block 540, the user accepts the modified price and selects one or more of any offered upgrades via the reservation interface 111. At block 545, the reservation service 141 reserves the dwelling unit (e.g., a room, a suite, a home, an apartment, a condominium, etc.) for the second stay at the modified price accepted by the user along with any selected upgrades. At block 550, the second stay is completed. At block 555, the ratings service 121 receives data from the data sources 101 for the second stay and updates user's rating and user profile 125 accordingly. For example, if the second stay is positive, the ratings service 121 may compute a relatively high score for the second stay, which may increase the overall rating for the user.

Figure 6:
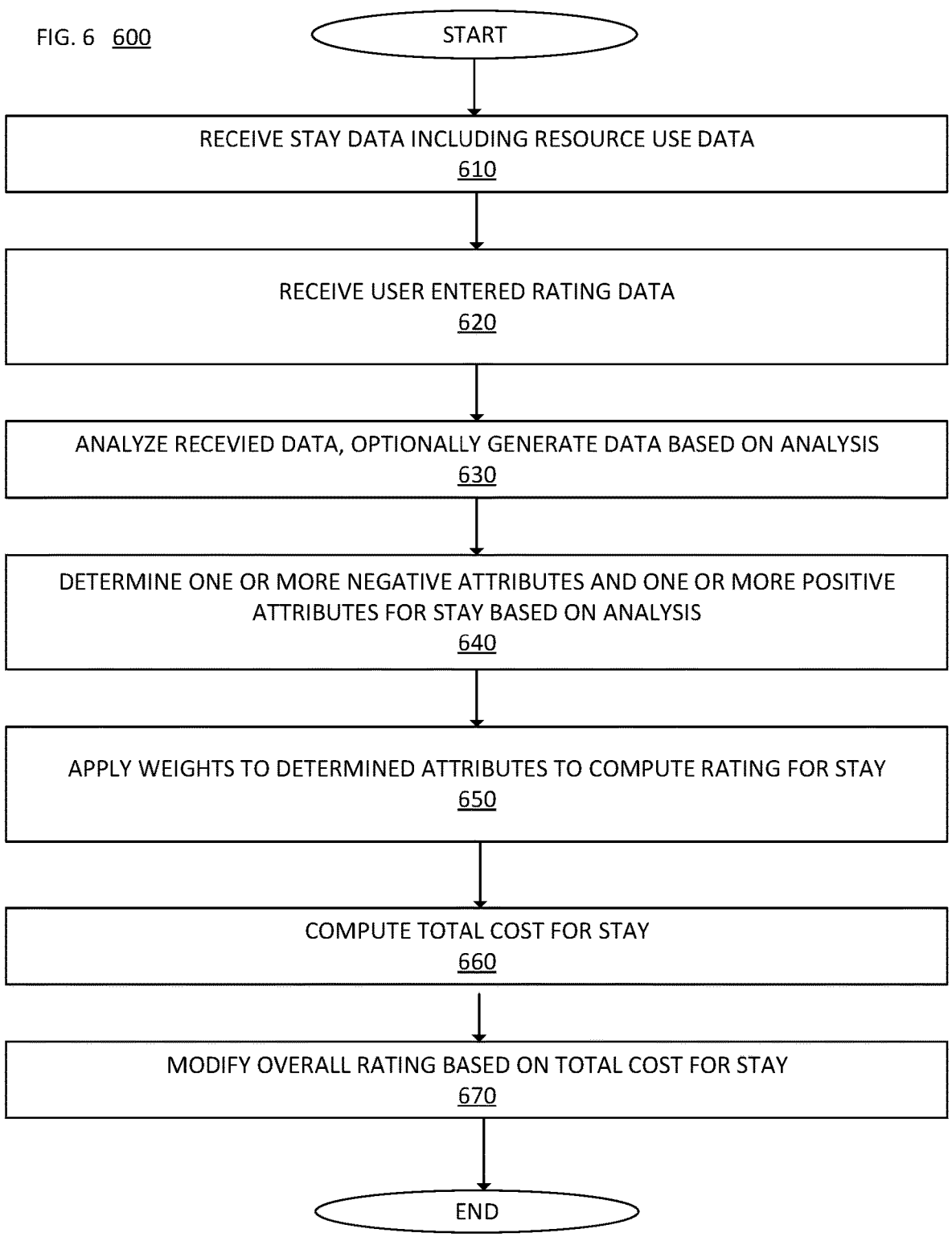
FIG. 6 illustrates an embodiment of a second logic flow.

FIG. 6 illustrates an embodiment of a logic flow 600. The logic flow 600 may be representative of some or all of the operations executed by one or more embodiments described herein. For example, the logic flow 600 may include some or all of the operations performed to determine a user rating. Embodiments are not limited in this context.

As shown, the logic flow 600 begins at block 610, where the ratings service 121 receives stay data from the data sources 101. As stated, the data received from the data sources 101 may include data describing a given stay, such as resource use data, check-in time, checkout time, billing statements, spending data, data reflecting the damage caused by the user, images, video, audio recordings, and the like. At block 620, the ratings service 121 receives ratings generated by one or more employees of the lodging establishment. For example, hotel managers, service professionals, and the like may rate a user based on interactions with the user. At block 630, the analysis algorithms 124 and/or the data generator 123 may analyze the received data. Doing so may allow the analysis algorithms 124 and/or the data generator 123 to programmatically generate data. For example, the analysis algorithms 124 may perform facial recognition to identify the user in the lobby and analyze audio of the user speaking to an employee to extract positive concepts from the speech. Doing so allows the analysis algorithms and/or the data generator 123 to determine that the user engaged in positive interactions with the hotel staff.

At block 640, one or more positive attributes and one or more negative attributes are determined for the stay based on the analysis performed at block 630 and/or the data received at blocks 610-620. For example, a positive attribute may be that the user did not damage the room, arrived and checked out on time, and/or was positive during interactions with the staff and/or other guests. As another example, a negative attribute may be that the user damaged another vehicle in the parking lot. At block 650, the ratings service 121 applies one or more weights to the attributes determined at block 640 to compute a rating for the user's stay and/or an overall rating for the user. At block 660, the ratings service 121 computes a total cost for the stay, e.g., based on spending data, resource use data, the amount paid for the stay, etc. At block 670, the ratings service 121 modifies the rating for the user's stay and/or the overall rating for the user based on the cost determined at block 660. For example, if the overall cost indicates the hotel lost money for the stay due to damage, excessive resource consumption, etc., the ratings service 121 may decrease the rating for the user stay and/or the overall rating for the user. The ratings service 121 may then store the modified ratings in the user profile 125 for the user in a record associated with the card number used to pay for the stay.

Figure 7:
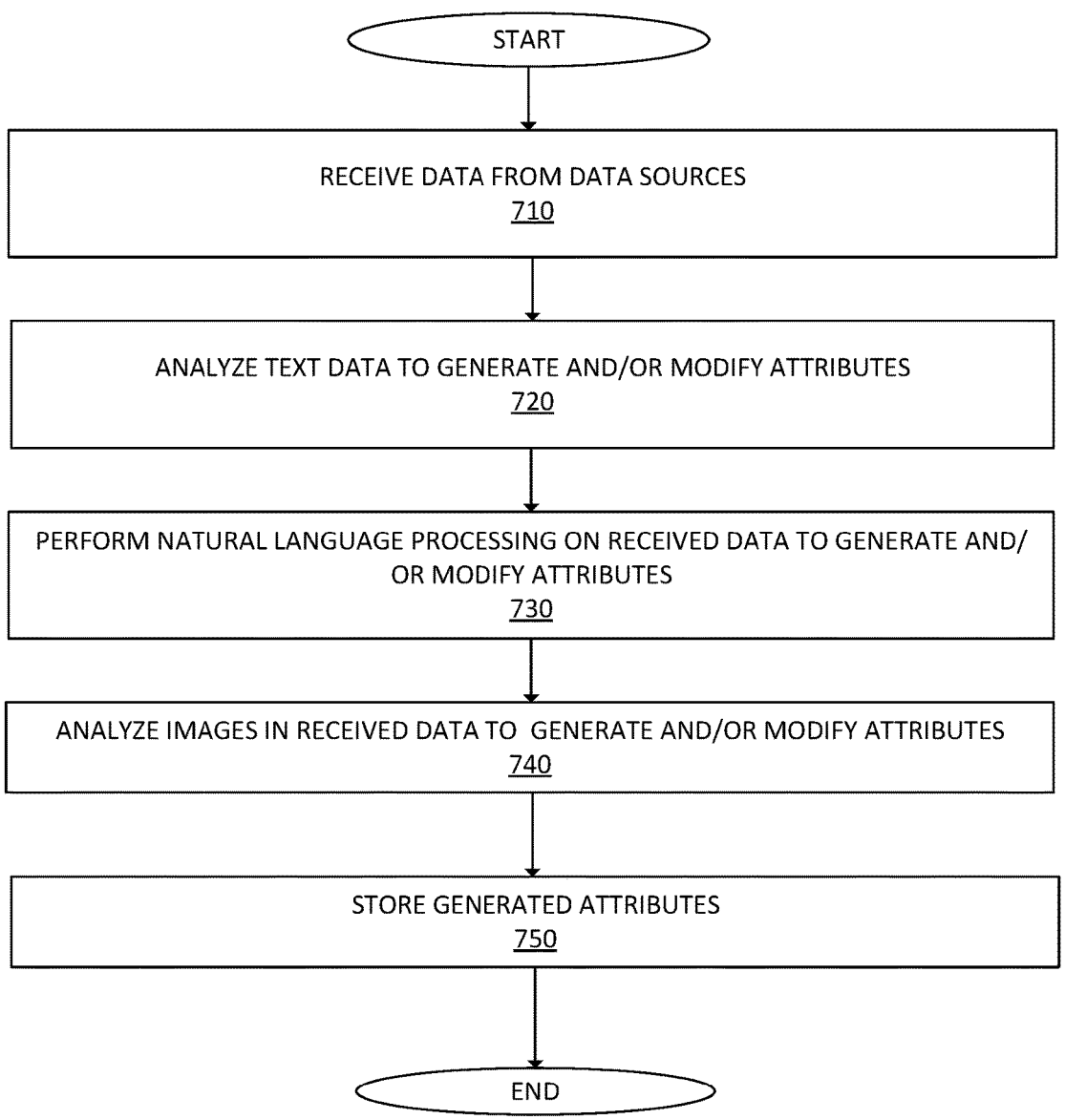
FIG. 7 illustrates an embodiment of a third logic flow.

FIG. 7 illustrates an embodiment of a logic flow 700. The logic flow 700 may be representative of some or all of the operations executed by one or more embodiments described herein. For example, the logic flow 700 may include some or all of the operations to process data received from the data sources 101. Embodiments are not limited in this context.

As shown, the logic flow 700 begins at block 710, where the ratings service 121 receives text data from the data sources 101. The data may include data provided by personnel of the lodging establishment (e.g., reviews, checklists, etc.). The data may further include data from one or more systems, such as billing systems, reservations systems, etc. At block 720, the analysis algorithms 124 analyze the text data to generate and/or modify one or more attributes of the associated user. For example, the analysis algorithms 124 may determine, based on the amount spent by the user at the hotel spa, that the user enjoys the hotel spa, which may be stored as a positive attribute in the profile 125 for the user. As another example, the analysis algorithms 124 may determine, based on charges for damage in the user's billing statement, that the user damaged the room and/or other common areas of the property. As such, a negative attribute for property damage may be generated and stored in the user profile 125.

At block 730, the analysis algorithms 124 may perform natural language processing on audio data 103 and/or text data 104 received from the data sources 101 to generate and/or modify one or more attributes of the associated user. For example, the analysis algorithms 124 may use natural language processing algorithms to identify positive sentiment in a transcript of the user's speech. The transcript may be generated based on audio data 103 including a recording of the user's speech when speaking with hotel staff. Doing so allows the analysis algorithms 124 to define a positive attribute for the user, which may be stored in the user profile 125. As another example, the analysis algorithms 124 may identify negative sentiment in a rating provided by the housekeeping staff. As such, the analysis algorithms 124 may define a negative attribute for the user, which may be stored in the user profile 125.

At block 740, the analysis algorithms 124 may perform image processing on the video data 102 to generate and/or modify one or more attributes of the associated user. For example, the analysis algorithms 124 may identify the user holding the door open for other guests in the lobby. As such, the analysis algorithms 124 may determine that the user is polite and store a politeness attribute in the user profile. As another example, the analysis algorithms 124 may identify the user causing damage to property (e.g., breaking a window, etc.), and generate a negative damage attribute for the user, which may be stored in the user profile 125. At block 750, the attributes generated and/or modified at blocks 720-740 are stored in the user profile 125 of the user.

Figure 8:
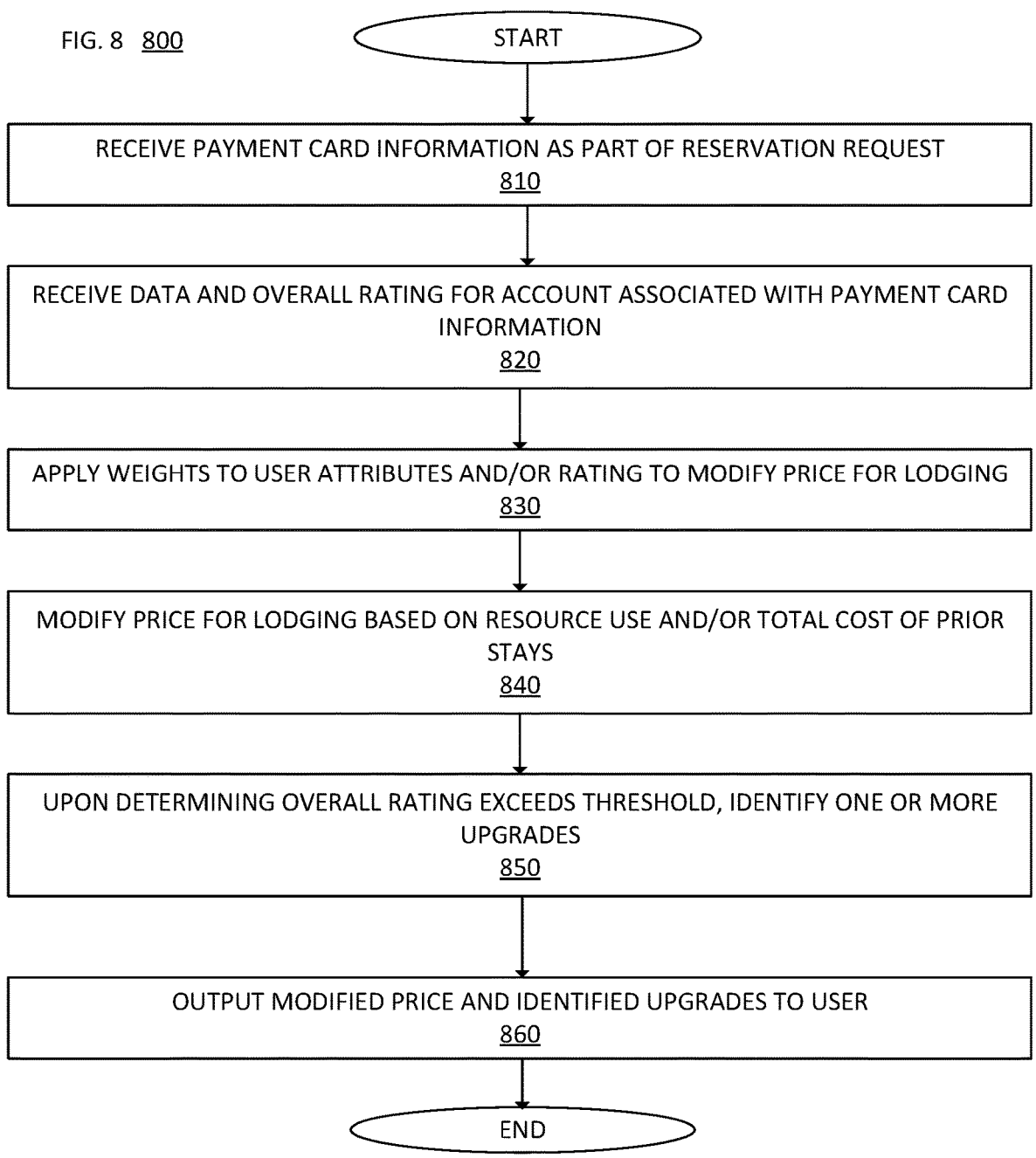
FIG. 8 illustrates an embodiment of a fourth logic flow.

FIG. 8 illustrates an embodiment of a logic flow 800. The logic flow 800 may be representative of some or all of the operations executed by one or more embodiments described herein. For example, the logic flow 800 may include some or all of the operations performed when a user attempts to reserve a room. Embodiments are not limited in this context.

As shown, the logic flow 800 begins at block 810, where the reservation interface 111 and/or reservation service 141 receives payment card information as part of a request to reserve a room in a lodging establishment. For example, the user may provide the payment card information in a payment field of a form in the reservation interface 111. As another example, the user may provide login credentials for their account. Once logged in, the reservation interface 111 and/or reservation service 141 may receive the payment card information from the user's profile 125. At block 820, the reservation service 141 may receive the user's overall rating and one or more attributes form the user profile 125.

At block 830, the reservation service 141 may apply one or more weights to the user's overall rating and/or one or more attributes received from the profile 125 to modify the price for the requested stay. For example, a first weight may be applied if the user's rating exceeds a first threshold, while a second weight may be applied if the user's rating is below a second threshold. As another example, a first weight may be applied to a damage attribute to increase the price of the stay, while a second weight may be applied to a profile that does not have a damage attribute to reduce the price of the stay. At block 840, the reservation service 141 may modify the price for the requested stay based on the amount of resource use specified in the user profile 125 and/or one or more total costs for previous stays in the user profile 125. For example, if a user uses less water and/or electricity than the average user, the reservation service 141 may reduce the price for the reservation. If, however, the user uses more water and/or electricity than the average user, the reservation service 141 may increase the price for the reservation. At block 850, the reservation service 141 determines that the overall rating for the user exceeds a threshold value and identifies one or more upgrades and/or rewards for the user. At block 860, the reservation service 141 causes the reservation interface 111 to output the modified price for the reservation and any identified upgrades and/or rewards to the user. The user may then select any upgrades and proceed to complete the reservation using the payment card information received at block 810.

Figure 9:
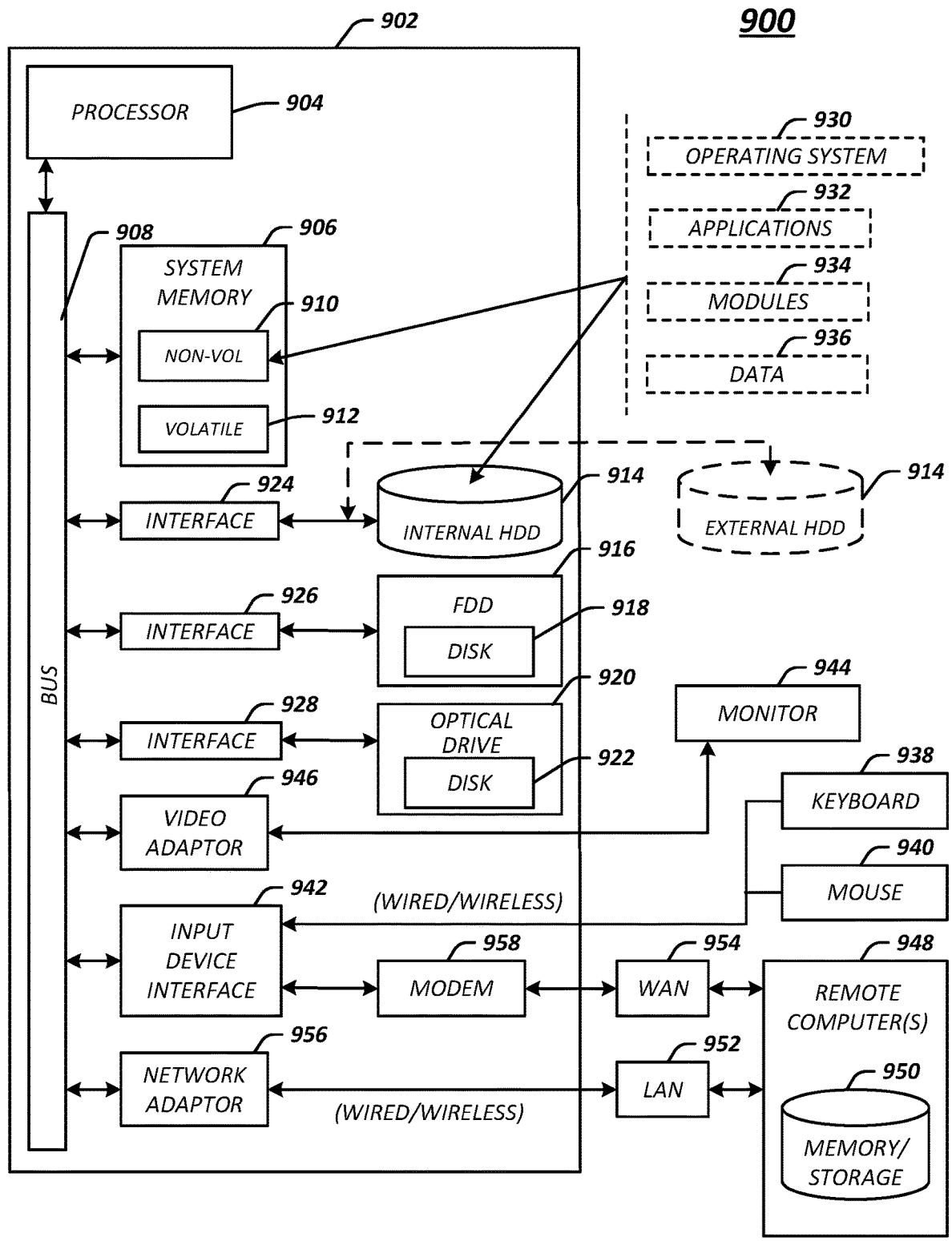
FIG. 9 illustrates an embodiment of a computing architecture.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100. In some embodiments, computing system 902 may be representative, for example, of the data sources 101, client devices 110, ratings systems 120, and/or the host systems 140 of the system 100. The embodiments are not limited in this context. More generally, the computing architecture 900 is configured to implement all logic, applications, systems, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100, e.g., the video data 102, audio data 103, text data 104, ratings service 121, rating interface 122, data generator 123, analysis algorithms 124, reservation service 141, and/or the user profiles 125-1 and 125-2.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 952 and the WAN 954.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure.

It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system, comprising:
a processor circuit; and
a memory storing instructions which when executed by the processor circuit, cause the processor circuit to:
receive a first rating for a user based on a first stay at a first lodging establishment, the first rating comprising at least one positive attribute and at least one negative attribute for the first stay of the user at the first lodging establishment, the first rating computed based on data entered by an employee of the first lodging establishment and programmatically generated data;
receive transaction data for a first account used to pay for the first stay;
receive a plurality of images and audio data from a plurality of data sources at the first lodging establishment, the audio data comprising a speech of the user;
identify the user depicted in a first image of the plurality of images based on a facial recognition algorithm applied to the image;
analyze the first image to determine that the first image depicts the user causing damage during the first stay;
generate a charge for the damage during the first stay based on identifying the user in the first image and the determination that the first image depicts the user causing the damage;
generate an indication of the damage as the at least one negative attribute of the first stay;
analyze the audio to determine a positive concept in the speech of the user;
generate an indication of the positive concept in the speech as the at least one positive attribute of the first stay;
receive, from a system of a second lodging establishment, an overall rating for the user;
update, based on the first rating and a plurality of prior ratings for the user, the overall rating for the user, the overall rating updated based at least in part on the at least one positive attribute and the at least one negative attribute for the first stay for the user at the first lodging establishment;
receive a request from the user to reserve a second stay at the first lodging establishment using the first account as payment;
receive a price for the second stay at the first lodging establishment;
determine, based on the updated overall rating for the user being above a threshold rating, a reduced price for the second stay, the reduced price less than the received price for the second stay;
determine an upgrade provided by the first lodging establishment based on a preference of the user;
determine that a number of instances of damage caused by the user exceeds a threshold number of instances of damage;
determine a security deposit associated with the number of instances of damage caused by the user exceeding the threshold number of instances of damage;
output an indication of the reduced price, the security deposit, and the upgrade for display;
receive an indication of acceptance of the upgrade, the security deposit, and the reduced price for the second stay; and
reserve a dwelling unit in the first lodging establishment for the second stay at the reduced price with the upgrade using the first account as payment.

2. The system of claim 1, wherein the overall rating provides greater accuracy relative to another rating computed without considering the data from the data sources, the memory storing instructions which when executed by the processor circuit, cause the processor circuit to:
receive a request from the user to reserve a third stay at a second lodging establishment using the first account as payment, the first and second lodging establishments comprising independently owned establishments;
transmit the updated overall rating to the system of the second lodging establishment;
receive, from the system of the second lodging establishment based on the updated overall rating, a price for the third stay at the second lodging establishment;
determine, based on the overall rating for the user being below a threshold rating for the second lodging establishment, an increased price for the third stay, the increased price greater than the received price for the third stay;
determine a security deposit for the third stay based on the number of instances of damage caused by the user exceeding the threshold number of instances of damage;
output an indication of the increased price and the security deposit for the third stay for display;
receive an indication of acceptance of the increased price and the security deposit for the third stay; and
reserve a dwelling unit in the second lodging establishment for the third stay using the first account as payment.

3. The system of claim 2, wherein the plurality of data sources include a plurality of cameras, a plurality of microphones, and a plurality of computing devices, the memory storing instructions which when executed by the processor circuit, cause the processor circuit to:
receive a second rating for the user based on the second stay at the first lodging establishment;
receive a third rating for the user based on the third stay at the second lodging establishment; and
update the overall rating for the user based on the second rating and the third rating.

4. The system of claim 1, the memory storing instructions which when executed by the processor circuit, cause the processor circuit to, prior to reserving the dwelling unit in the first lodging establishment:
determine, based on the analysis of the first image, that the first image depicts an object and that the object depicted in the first image is damaged;
analyze a second image of the plurality of images to determine that the second image depicts the object;
compare the first image and the second image to determine a difference between the object depicted in the first image and the object depicted the second image;

determine, based on the comparison of the first and second images and the determined difference, that the object was damaged; and determine the preference of the user specified in a profile for the user.

5. The system of claim 1, the memory storing instructions which when executed by the processor circuit, cause the processor circuit to:

compute a total cost for the first stay at the first lodging establishment, the total cost based at least in part on: an amount paid for the first stay, an amount of water used by the user during the first stay, an amount of electricity used for the first stay, and an amount of damage caused by the user during the first stay;

modify the overall rating of the user based on the total cost of the first stay; and modify the reduced price based on the modified overall rating of the user.

6. The system of claim 1, wherein the plurality of ratings are associated with a payment card of the first account, wherein the at least one negative attribute and the at least one positive attribute are selected from a plurality of attributes comprising: (i) a cleanliness attribute, (ii) a damage attribute, (iii) a timeliness attribute, (iv) a spending attribute, (v) a resource use attribute, (vi) a noise attribute, and (vii) a politeness attribute, wherein the first rating is determined based at least in part on: (i) a first weight applied to the cleanliness attribute, (ii) a second weight applied to the damage attribute, (iii) a third weight applied to the timeliness attribute, (iv) a fourth weight applied to the spending attribute, (v) a fifth weight applied to the resource use attribute, (vi) a sixth weight applied to the noise attribute, and (vii) a seventh weight applied to the politeness attribute.

7. A non-transitory computer-readable storage medium having computer-readable program code embodied therewith, the computer-readable program code executable by a processor circuit to cause the processor circuit to:

receive a first rating for a user based on a first stay at a first lodging establishment, the first rating comprising at least one positive attribute and at least one negative attribute for the first stay of the user at the first lodging establishment, the first rating computed based on data entered by an employee of the first lodging establishment and programmatically generated data;

receive transaction data for a first account used to pay for the first stay;

receive a plurality of images and audio data from a plurality of data sources at the first lodging establishment, the audio data comprising a speech of the user;

identify the user depicted in a first image of the plurality of images based on a facial recognition algorithm applied to the first image;

analyze the first image to determine that the first image depicts the user causing damage during the first stay;

generate a charge for the damage during the first stay based on identifying the user in the first image and the determination that the first image depicts the user causing the damage;

generate an indication of the damage as the at least one negative attribute of the first stay;

analyze the audio to determine a positive concept in the speech of the user;

generate an indication of the positive concept in the speech as the at least one positive attribute of the first stay;

receive, from a system of a second lodging establishment, an overall rating for the user;

update, based on the first rating and a plurality of prior ratings for the user, the overall rating for the user, the overall rating updated based at least in part on the at least one positive attribute and the at least one negative attribute for the first stay for the user at the first lodging establishment;

receive a request from the user to reserve a second stay at the first lodging establishment using the first account as payment;

receive a price for the second stay at the first lodging establishment;

determine, based on the updated overall rating for the user being above a threshold rating, a reduced price for the second stay, the reduced price less than the received price for the second stay;

determine an upgrade provided by the first lodging establishment based on a preference of the user;

determine that a number of instances of damage caused by the user exceeds a threshold number of instances of damage;

determine a security deposit associated with the number of instances of damage caused by the user exceeding the threshold number of instances of damage;

output an indication of the reduced price, the security deposit, and the upgrade for display;

receive an indication of acceptance of the upgrade, the security deposit, and the reduced price for the second stay; and reserve a dwelling unit in the first lodging establishment for the second stay at the reduced price with the upgrade using the first account as payment.

8. The non-transitory computer-readable storage medium of claim 7, wherein the overall rating provides greater accuracy relative to another rating computed without considering the data from the data sources, further comprising computer-readable program code executable by the processor circuit to cause the processor circuit to:

receive a request from the user to reserve a third stay at a second lodging establishment using the first account as payment, the first and second lodging establishments comprising independently owned establishments;

transmit the updated overall rating to the system of the second lodging establishment;

receive, from the system of the second lodging establishment based on the updated overall rating, a price for the third stay at the second lodging establishment;

determine, based on the overall rating for the user being below a threshold rating for the second lodging establishment, an increased price for the third stay, the increased price greater than the received price for the third stay;

determine a security deposit for the third stay based on the number of instances of damage caused by the user exceeding the threshold number of instances of damage;

output an indication of the increased price and the security deposit for the third stay for display;

receive an indication of acceptance of the increased price and the security deposit for the third stay; and reserve a dwelling unit in the second lodging establishment for the third stay using the first account as payment.

9. The non-transitory computer-readable storage medium of claim 8, wherein the plurality of data sources include a plurality of cameras, a plurality of microphones, and a plurality of computing devices, further comprising computer-readable program code executable by the processor circuit to cause the processor circuit to:

receive a second rating for the user based on the second stay at the first lodging establishment;

receive a third rating for the user based on the third stay at the second lodging establishment; and update the overall rating for the user based on the second rating and the third rating.

10. The non-transitory computer-readable storage medium of claim 7, further comprising computer-readable program code executable by the processor circuit to cause the processor circuit to:

determine, based on the analysis of the first image, that the first image depicts an object and that the object depicted in the first image is damaged;

analyze a second image of the plurality of images to determine that the second image depicts the object;

compare the first image and the second image to determine a difference between the object depicted in the first image and the object depicted the second image;

determine, based on the comparison of the first and second images and the determined difference, that the object was damaged; and determine the preference of the user specified in a profile for the user.

11. The non-transitory computer-readable storage medium of claim 7, further comprising computer-readable program code executable by the processor circuit to cause the processor circuit to:

compute a total cost for the first stay at the first lodging establishment, the total cost based at least in part on: an amount paid for the first stay, an amount of water used by the user during the first stay, an amount of electricity used for the first stay, and an amount of damage caused by the user during the first stay;

modify the overall rating of the user based on the total cost of the first stay; and modify the reduced price based on the modified overall rating of the user.

12. The non-transitory computer-readable storage medium of claim 7, wherein the plurality of ratings are associated with a payment card of the first account, wherein the at least one negative attribute and the at least one positive attribute are selected from a plurality of attributes comprising: (i) a cleanliness attribute, (ii) a damage attribute, (iii) a timeliness attribute, (iv) a spending attribute, (v) a resource use attribute, (vi) a noise attribute, and (vii) a politeness attribute, wherein the first rating is determined based at least in part on: (i) a first weight applied to the cleanliness attribute, (ii) a second weight applied to the damage attribute, (iii) a third weight applied to the timeliness attribute, (iv) a fourth weight applied to the spending attribute, (v) a fifth weight applied to the resource use attribute, (vi) a sixth weight applied to the noise attribute, and (vii) a seventh weight applied to the politeness attribute.

13. A method, comprising:

receiving a first rating for a user based on a first stay at a first lodging establishment, the first rating comprising at least one positive attribute and at least one negative attribute for the first stay of the user at the first lodging establishment, the first rating based on data entered by an employee of the first lodging establishment and programmatically generated data;

receiving transaction data for a first account used to pay for the first stay;

receiving a plurality of images and audio data from a plurality of data sources at the first lodging establishment, the audio data comprising a speech of the user;

identifying the user depicted in a first image of the plurality of images based on a facial recognition algorithm applied to the first image;

analyzing the first image to determine that the first image depicts the user causing damage during the first stay;

generating a charge for the damage during the first stay based on identifying the user in the first image and the determination that the first image depicts the user causing the damage;

generating an indication of the damage as the at least one negative attribute of the first stay;

analyzing the audio to determine a positive concept in the speech of the user;

generating an indication of the positive concept in the speech as the at least one positive attribute of the first stay;

receiving, from a system of a second lodging establishment, an overall rating for the user;

updating, based on the first rating and a plurality of prior ratings for the user, the overall rating for the user, the overall rating updated based at least in part on the at least one positive attribute and the at least one negative attribute for the first stay for the user at the first lodging establishment;

receiving a request from the user to reserve a second stay at the first lodging establishment using the first account as payment;

receiving a price for the second stay at the first lodging establishment;

determining, based on the updated overall rating for the user being above a threshold rating, a reduced price for the second stay, the reduced price less than the received price for the second stay;

determining an upgrade provided by the first lodging establishment based on a preference of the user;

determining that a number of instances of damage caused by the user exceeds a threshold number of instances of damage;

determining a security deposit associated with the number of instances of damage caused by the user exceeding the threshold number of instances of damage;

outputting an indication of the reduced price, the security deposit, and the upgrade for display;

receiving an indication of acceptance of the upgrade, the security deposit, and the reduced price for the second stay; and reserving a dwelling unit in the first lodging establishment for the second stay at the reduced price with the upgrade using the first account as payment.

14. The method of claim 13, wherein the overall rating provides greater accuracy relative to another rating computed without considering the data from the data sources, the method further comprising:

receiving a request from the user to reserve a third stay at a second lodging establishment using the first account as payment, the first and second lodging establishments comprising independently owned establishments;

transmitting the updated overall rating to the system of the second lodging establishment;

receiving, from the system of the second lodging establishment based on the updated overall rating, a price for the third stay at the second lodging establishment;

determining, based on the overall rating for the user being below a threshold rating for the second lodging establishment, an increased price for the third stay, the increased price greater than the received price for the third stay;

determining a security deposit for the third stay based on the number of instances of damage caused by the user exceeding the threshold number of instances of damage;

outputting an indication of the increased price and the security deposit for the third stay for display;

receiving an indication of acceptance of the increased price and the security deposit for the third stay; and reserving a dwelling unit in the second lodging establishment for the third stay using the first account as payment.

15. The method of claim 14, wherein the plurality of data sources include a plurality of cameras, a plurality of microphones, and a plurality of computing devices, the method further comprising:

receiving a second rating for the user based on the second stay at the first lodging establishment;

receiving a third rating for the user based on the third stay at the second lodging establishment; and updating the overall rating for the user based on the second rating and the third rating.

16. The method of claim 13, further comprising:

determining, based on the analysis of the first image, that the first image depicts the object and that the object depicted in the first image is damaged;

analyzing a second image of the plurality of images to determine that the second image depicts the object;

comparing the first image and the second image to determine a difference between the object depicted in the first image and the object depicted the second image;

determining, based on the comparison of the first and second images and the determined difference, that the object was damaged; and determining the preference of the user specified in a profile for the user.

17. The method of claim 13, further comprising:

computing a total cost for the first stay at the first lodging establishment, the total cost based at least in part on: an amount paid for the first stay, an amount of water used by the user during the first stay, an amount of electricity used for the first stay, and an amount of damage caused by the user during the first stay;

modifying the overall rating of the user based on the total cost of the first stay; and modifying the reduced price based on the modified overall rating of the user.

18. The method of claim 13, wherein the plurality of ratings are associated with a payment card of the first account, wherein the at least one negative attribute and the at least one positive attribute are selected from a plurality of attributes comprising: (i) a cleanliness attribute, (ii) a damage attribute, (iii) a timeliness attribute, (iv) a spending attribute, (v) a resource use attribute, (vi) a noise attribute, and (vii) a politeness attribute.

\* \* \* \* \*